(12) United States Patent
Seki et al.

(10) Patent No.: US 10,054,153 B2
(45) Date of Patent: Aug. 21, 2018

(54) MANUFACTURING METHOD FOR SLIDING BEARING, AND SLIDING BEARING

(71) Applicant: TAIHO KOGYO Co., Ltd., Toyota-shi, Aichi (JP)

(72) Inventors: Daisuke Seki, Toyota (JP); Yuji Takagi, Toyota (JP)

(73) Assignee: TAIHO KOGYO CO., LTD., Aichi (JP)

( * ) Notice: Subject to any disclaimer, the term of this patent is extended or adjusted under 35 U.S.C. 154(b) by 0 days.

(21) Appl. No.: 15/553,787

(22) PCT Filed: Feb. 26, 2016

(86) PCT No.: PCT/JP2016/055952
§ 371 (c)(1),
(2) Date: Aug. 25, 2017

(87) PCT Pub. No.: WO2016/136997
PCT Pub. Date: Sep. 1, 2016

(65) Prior Publication Data
US 2018/0031030 A1 Feb. 1, 2018

(30) Foreign Application Priority Data
Feb. 27, 2015 (JP) ................................. 2015-039117

(51) Int. Cl.
*F16C 9/02* (2006.01)
*F16C 17/02* (2006.01)
(Continued)

(52) U.S. Cl.
CPC ............... *F16C 9/02* (2013.01); *F16C 17/02* (2013.01); *F16C 33/10* (2013.01); *F16C 33/14* (2013.01); *F16C 33/203* (2013.01)

(58) Field of Classification Search
CPC .. F16C 9/02; F16C 33/10; F16C 33/14; F16C 17/02; F16C 33/203
See application file for complete search history.

(56) References Cited

U.S. PATENT DOCUMENTS

| 6,872,004 B2 | 3/2005 | Mian et al. |
| 8,888,370 B2 | 11/2014 | Kobayakawa et al. |

(Continued)

FOREIGN PATENT DOCUMENTS

| JP | H09126227 A | 5/1997 |
| JP | 2003532036 A | 10/2003 |

(Continued)

OTHER PUBLICATIONS

Korean Intellectual Property Office (KIPO) Notification of Reason for Refusal corresponding to Application No. 10-2017-7027049; dated Dec. 26, 2017.

(Continued)

*Primary Examiner* — Ryan J Walters
(74) *Attorney, Agent, or Firm* — Cantor Colburn LLP

(57) ABSTRACT

A manufacturing method for a sliding bearing including half members, obtained by splitting a cylinder in half in a direction parallel with an axial direction, arranged in an upper and lower direction, may include a first step including forming a narrow groove extending in the circumference direction on an axial direction end of one of the half members on a lower side, on a downstream side in a rotation direction, a second step including performing shot blasting on a surface of the narrow groove; and a third step including forming coating layers on a surface of the half member. The coating layers may be formed only on an upstream-side end and a downstream-side end as parts of the narrow groove.

4 Claims, 4 Drawing Sheets

(51) Int. Cl.
    *F16C 33/20*     (2006.01)
    *F16C 33/14*     (2006.01)
    *F16C 33/10*     (2006.01)

(56) References Cited

U.S. PATENT DOCUMENTS

| | | |
|---|---|---|
| 9,657,769 B2 | 5/2017 | Ashihara et al. |
| 2004/0062458 A1 | 4/2004 | Mian et al. |
| 2014/0037236 A1 | 2/2014 | Kobayakawa et al. |
| 2016/0195127 A1 | 7/2016 | Ashihara et al. |

FOREIGN PATENT DOCUMENTS

| | | | |
|---|---|---|---|
| JP | 2012047276 A | 3/2012 |
| JP | 2012189184 A | 10/2012 |
| JP | 2014031871 A | 2/2014 |
| JP | 2014181811 A | 9/2014 |
| JP | 2014224601 A | 12/2014 |

OTHER PUBLICATIONS

International Search Report for corresponding Application No. PCT/JP2016/055952; dated May 24, 2016.

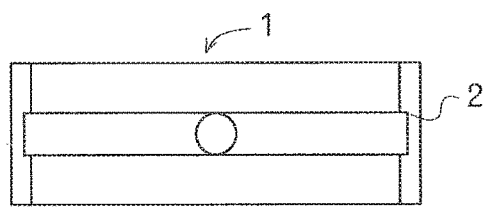
FIG. 2A
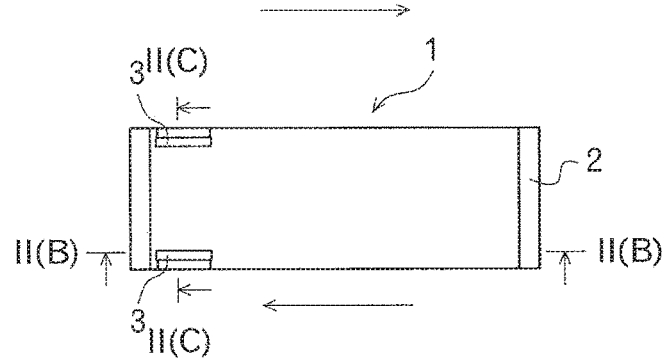
FIG. 2B
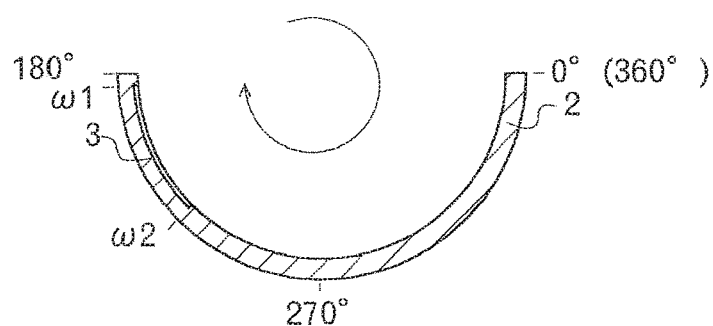
FIG. 2C
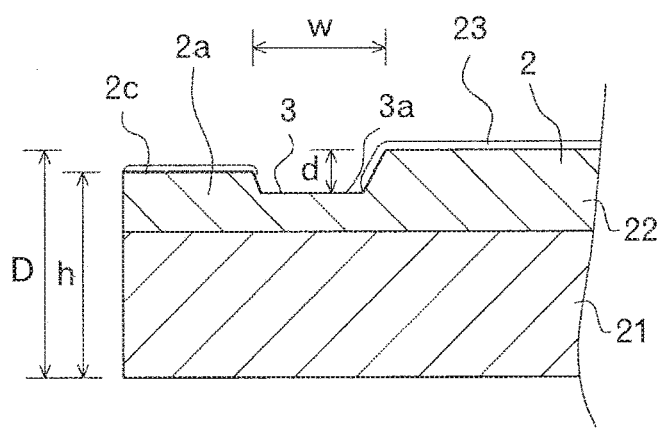

MANUFACTURING METHOD FOR SLIDING BEARING, AND SLIDING BEARING

CROSS REFERENCE TO RELATED APPLICATIONS

This is the U.S. national stage of application No. PCT/JP2016/055952, filed on Feb. 26, 2016. Priority under 35 U.S.C. § 119(a) and 35 U.S.C. § 365(b) is claimed from Japanese Application No. 2015-039117, filed on Feb. 27, 2015, the disclosures of which are also incorporated herein by reference.

TECHNICAL FIELD

The present invention relates to a technique of a manufacturing method for a sliding bearing, and can be applied to a manufacturing method for a sliding bearing including half members, obtained by splitting a cylinder in half in a direction parallel with an axial direction, arranged in an upper and lower direction, and to the sliding bearing.

BACKGROUND ART

Conventionally known sliding bearings, for supporting a crankshaft of an engine, having a split structure in which two members obtained by splitting a cylindrical member in half are combined are plagued by a large friction due to high viscosity of oil during a cold engine operation. Thus, one known bearing has relief portions (narrow grooves) formed over the entire circumference in both ends of the bearing in an axial direction (for example, see Patent Literature 1).

CITATION LIST

Patent Literature

PTL 1: Japanese Translation of PCT International Application Publication No. JP-T-2003-532036

SUMMARY OF INVENTION

Technical Problem

Such a bearing in which the narrow grooves are formed fails to achieve both a larger quantity of lead-in oil and a smaller quantity of outflow oil flowing through both ends in the axial direction. Thus, a further friction reducing effect has been unable to be expected.

Thus, the present invention is made in view of the problem described above, and provides a manufacturing method for a sliding bearing and a sliding bearing that can achieve a smaller total quantity of outflow oil as well as a further friction reducing effect.

Solution to Problem

The problem of the present invention is as described above. Next, a solution of the problem is described.

The present invention is a manufacturing method for a sliding bearing including half members, obtained by splitting a cylinder in half in a direction parallel with an axial direction, arranged in an upper and lower direction, the method including: a first step in which a narrow groove extending in the circumference direction is formed on an axial direction end of one of the half members on a lower side, on a downstream side in a rotation direction; a second step in which shot blasting is performed on a surface of the narrow groove; and a third step in which coating layers are formed on a surface of the half member. In the third step, the coating layers are formed only on an upstream-side end and a downstream-side end as parts of the narrow groove.

In the present invention, the coating layers formed in the third step may each include at least one of molybdenum disulfide, graphite, carbon, polytetrafluoroethylene, boron nitride, tungsten disulfide, and fluorine-based resin.

In the present invention, a circumference edge portion may be formed on a surface on an outer side of the narrow groove in the axial direction. The circumference edge portion may be formed to have a height from an outer circumference surface of the half member shorter than a height of a contact surface from the outer circumference surface of the half member.

The present invention is a sliding bearing manufactured by the manufacturing method.

Advantageous Effects of Invention

The present invention provides the following advantageous effects.

The narrow groove is provided without hindering generation of oil film pressure, whereby a friction reducing effect can be achieved with a smaller sliding area and the total quantity of outflow oil can be reduced. The satin-finished surface is formed with numerous dents formed on a surface of the narrow groove by the shot blasting. Thus, the lubricant oil is held within the narrow groove so that a quantity of the outflow oil can be reduced. The coating layers are formed on the upstream-side end and the downstream-side end of the narrow groove so that the quantity of the outflow oil can be reduced due to the lipophilicity of the coating layers, whereby the total quantity of the outflow oil can be reduced.

BRIEF DESCRIPTION OF DRAWINGS

FIG. 2A is a plan view of a half member as part of the sliding bearing according to the embodiment of the present invention, FIG. 2B is a cross-sectional view of the same taken along line II(B)-II(B), and FIG. 2C is a cross-sectional view of the same taken along line II(C)-II(C).

DESCRIPTION OF EMBODIMENTS

Figure 1:
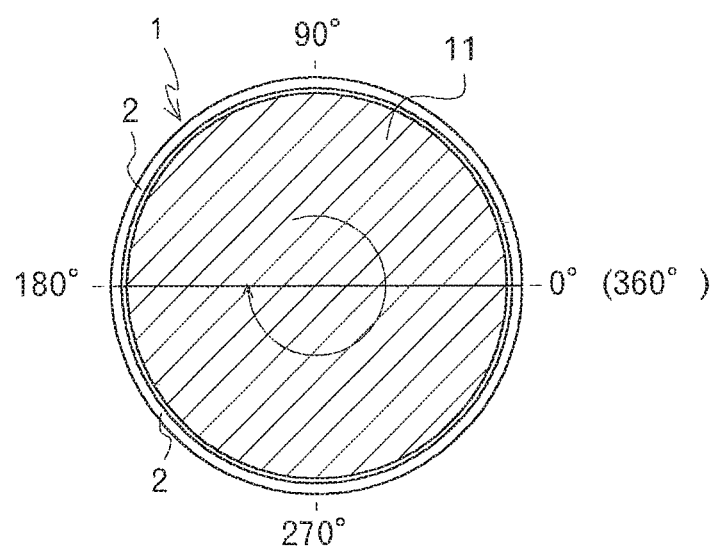
FIG. 1 is a front view of a sliding bearing according to an embodiment of the present invention.

An embodiment of the invention is described below. FIG. 1 is a front view of a sliding bearing 1, with a vertical direction of the sheet defined as an upper and lower direction, and a direction between a closer side and a farther side of the sheet defined as an axial direction (front and rear direction).

First of all, half members 2 as parts of the sliding bearing 1 according to an embodiment of the present invention are described with reference to FIG. 1 and FIG. 2A-FIG. 2C.

The sliding bearing 1 is a cylindrical member, and is applied to a sliding bearing structure of a crankshaft 11 of an engine as illustrated in FIG. 1. The sliding bearing 1 includes two half members 2 and 2. The two half members 2 and 2 have shapes obtained by splitting a cylinder in half in a direction parallel with the axial direction, and each have a semicircular cross-sectional shape. In the present embodiment, the half members 2 and 2 are arranged in the upper and lower direction with joining surfaces provided on left and right sides. When the sliding bearing 1 is supporting the crankshaft 11, a predetermined gap is formed, and lubricant oil is supplied into the gap through an unillustrated oil path.

FIG. 2A illustrates the half members 2 on upper and lower sides. In the present embodiment, a rotation direction of the crankshaft 11 corresponds to the clockwise direction in front view as indicated by an arrow in FIG. 1. A bearing angle $\omega$ is 0° at a right end position in FIG. 2B, and increases along the counterclockwise direction in FIG. 2B. More specifically, the bearing angle $\omega$ in FIG. 2B is defined as 180° at a left end position, and as 270° at a lower end position.

The upper half member 2 has an inner circumference provided with a groove extending along a circumference direction and provided with a circular hole at the center. The joining surfaces are provided on the left and right sides of the upper half member 2. As illustrated in FIG. 2C, the half member 2 includes a metal layer 21 and a lining layer 22.

The lower half member 2 has an inner circumference with ends in the axial direction provided with narrow grooves 3.

A circumference edge portion 2a is formed on a surface on the outer side of each of the narrow grooves 3 in the axial direction, and is formed to have a height h from an outer circumference surface of the half member 2 that is shorter than a height D of a contact surface from the outer circumference surface of the half member 2. Thus, the circumference edge portion 2a on the outer side in the axial direction is formed to be one step lower than the contact surface, adjacent to the circumference edge portion 2a, to be in contact with the crankshaft 11.

The narrow groove 3 is described with reference to FIG. 2B and FIG. 2C.

The narrow grooves 3 are provided on the lower half member 2. In the present embodiment, two narrow grooves 3 are arranged along the axial direction. More specifically, the narrow groove 3 extends along the circumference direction to a bearing angle $\omega 2$ in a direction in which the bearing angle $\omega$ increases (counterclockwise direction) from a position (with the bearing angle $\omega$ of $\omega 1$) separated from the joining surface (with the bearing angle $\omega$ of 180°) on a downstream side in a rotation direction of the crankshaft 11. The lower half member 2 has a joining surface on the right side in FIG. 2B as a joining surface on an upstream side in the rotation direction, and a joining surface on the left side in FIG. 2B as the joining surface on the downstream side in the rotation direction.

The narrow groove 3 is formed to have a width was illustrated in FIG. 2C.

The narrow groove 3 is also formed to have a depth d shorter than the height D of the contact surface from the outer circumference surface of the half member 2.

With the circumference edge portion 2a formed one step above a bottom surface 3a of the narrow groove 3, a wall for preventing oil from leaking from a sliding surface to the axial direction end and preventing sucked back oil from leaking again can be provided, whereby a quantity of outflow oil can be reduced. Thus, the quantity of the sucked back oil can be increased during a cold engine operation, and a higher friction reducing effect can be achieved with quick heating.

With the circumference edge portion 2a formed to be one step lower than the contact surface, adjacent to the circumference edge portion 2a, to be in contact with the crankshaft 11, the circumference edge portion 2a is less likely to be in contact with the crankshaft 11 inclined to be in a state of being in contact with one end in the axial direction (partial contact state), and thus can be prevented from being damaged.

With the narrow grooves 3 according to the present embodiment, a smaller FMEP is achieved. An especially smaller FMEP is achieved in a region with a low engine speed. The FMEP is a value indicating friction characteristics. Smaller FMEP leads to a lower friction. For example, at the timing of engine cold start, FMEP is reduced and the friction is reduced.

Figure 3:
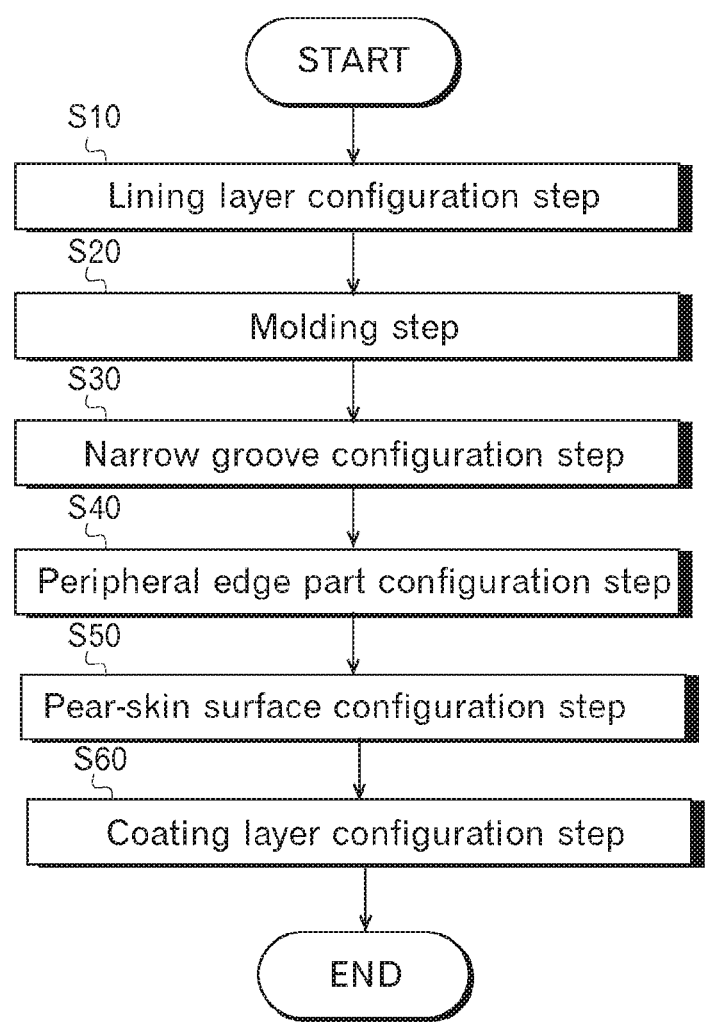
FIG. 3 is a flowchart illustrating a manufacturing method for the half member according to the embodiment of the present invention.

A method for manufacturing the lower half member 2, as part of the sliding bearing 1, is described with reference to FIG. 3.

The method for manufacturing the lower half member 2 includes: a lining layer forming step S10 in which the lining layer 22 is attached to the metal layer 21; a shaping step S20 in which the lining layer 22 and the metal layer 21 are shaped into a semicircular shape; a narrow groove forming step S30 as a first step in which the narrow groove 3 is formed; a circumference edge portion forming step S40 in which the circumference edge portion 2a is formed; a satin-finished surface shaping step S50 as a second step in which shot blasting is performed on the narrow groove 3 and the circumference edge portion 2a to form a satin-finished surface; and a coating layer forming step S60 as a third step in which an unillustrated coating layer is formed on a surface of the lining layer 22. These steps are described below in detail.

In the lining layer forming step S10, the lining layer 22 is attached to the metal layer 21. More specifically, the metal layer 21 and the lining layer 22 are rolled to be attached to each other. The metal layer 21 is made of a metal material, an example of which includes an iron-based material. The lining layer 22 is made of a metal material with a lower hardness than the metal layer 21, an example of which includes an aluminum-based material.

In the shaping step S20, the metal layer 21 and the lining layer 22 are shaped into a semicircular shape. More specifically, the metal layer 21 and the lining layer 22 are pressed to be shaped into a semicircular shape.

Next, in the narrow groove forming step S30, the narrow groove 3 is formed. In the circumference edge portion forming step S40, the circumference edge portion 2a is formed. The narrow groove 3 and the circumference edge portion 2a are formed by cutting.

The cutting is performed with a cutting tool such as a metal saw.

In the circumference edge portion forming step S40, an inner circumference surface 2c of the circumference edge portion 2a is formed more on an inner circumference side than the bottom surface 3a of the narrow groove 3.

In the satin-finished surface shaping step S50, the shot blasting is performed on the narrow groove 3 and the circumference edge portion 2a to form the satin-finished surface. In the shot blasting, a blasting material collides on the narrow groove 3 and on the circumference edge portion 2a, whereby numerous dents are formed. Thus, the satin-finished surfaces, as shaded portions in FIG. 4B, are formed on the narrow groove 3 and the circumference edge portion 2a as illustrated in FIG. 4B. The lubricant oil is held by the numerous dents on the satin-finished surface, whereby the amount of oil flowing out from the narrow groove 3 and the circumference edge portion 2a can be reduced.

Next, in the coating layer forming step S60, unillustrated coating layers 23 are formed on a surface (inner circumference surface) of the lining layer 22. The coating layers 23 each include at least one of molybdenum disulfide, graphite, carbon, polytetrafluoroethylene, boron nitride, tungsten disulfide, and fluorine-based resin. The coating layer 23 with such a configuration has lipophilicity.

Figure 4A:
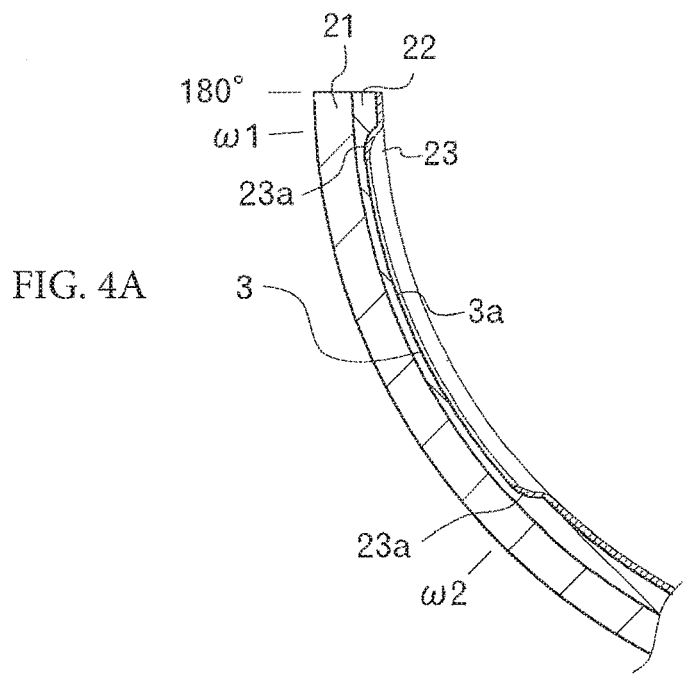
FIG. 4A is a partially enlarged cross-sectional view of the half member according to the embodiment of the present invention taken along line II(B)-II(B)
Figure 4B:
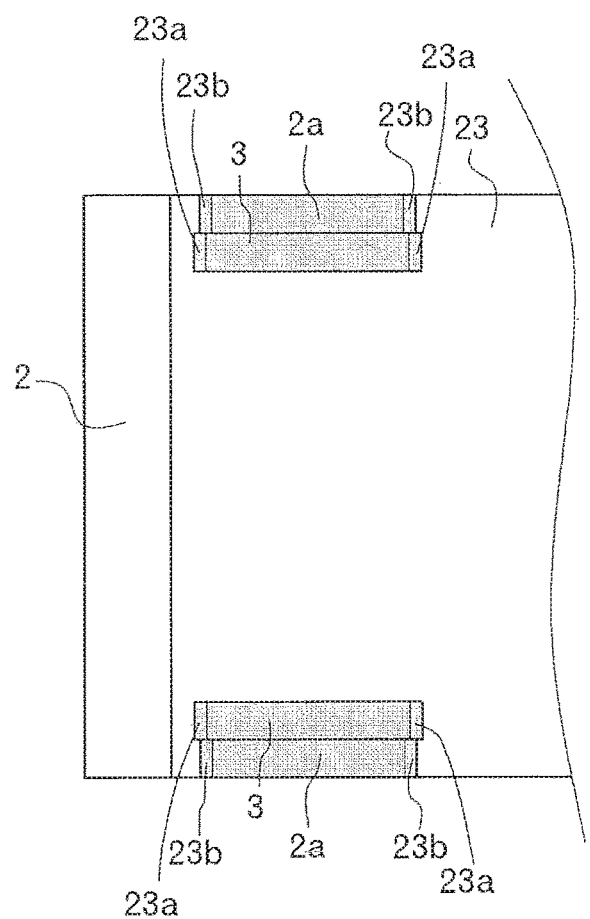
FIG. 4B is a partially enlarged plan view.

As illustrated in FIG. 4A and FIG. 4B, coating layers 23a and 23a are at least partially provided on upstream and downstream-side ends of the narrow groove 3 in the inner circumference surface. The coating layers 23a and 23a are formed on the surface of the narrow groove 3 on which the satin-finished surface is formed. With this configuration, the lubricant oil flowed to the upstream and downstream-side ends of the narrow groove 3 can be captured by the coating layers 23a and 23a.

As illustrated in FIG. 4A and FIG. 4B, coating layers 23b and 23b are at least partially provided on the upstream and downstream-side ends of the circumference edge portion 2a in the inner circumference surface. The coating layers 23b and 23b are formed on the surface of the narrow grooves 3 on which the satin-finished surface is formed. With this configuration, the lubricant oil flowed to the upstream and downstream-side ends of the circumference edge portion 2a can be captured by the coating layers 23b and 23b.

The above-described manufacturing method for the sliding bearing 1 including the half members 2 and 2, obtained by splitting a cylinder in half in a direction parallel with the axial direction, arranged in an upper and lower direction includes: the narrow groove forming step S30 in which the narrow groove 3 extending in the circumference direction is formed on the axial direction end of the lower half member 2 on a downstream side in the rotation direction (first step); the satin-finished surface shaping step S50 in which the shot blasting is performed on the surface of the narrow groove 3 (second step); and the coating layer forming step S60 in which the coating layers 23 are formed on the surface of the half member 2 (third step). In the coating layer forming step S60, the coating layers 23a are formed on the upstream-side end and the downstream-side end of the narrow groove 3.

With this configuration, the narrow groove 3 is provided without hindering generation of oil film pressure, whereby a friction reducing effect can be achieved with a smaller sliding area and the total quantity of outflow oil can be reduced. The satin-finished surface is formed with numerous dents formed on the surface of the narrow groove 3 by the shot blasting. Thus, the lubricant oil is held within the narrow groove 3 so that a quantity of the outflow oil can be reduced. The coating layers 23a are formed on the upstream-side end and the downstream-side end of the narrow groove 3 so that the quantity of the outflow oil can be reduced due to the lipophilicity of the coating layers 23a, whereby the total quantity of the outflow oil can be reduced.

The coating layers 23 formed in the coating layer forming step S60 each include at least one of molybdenum disulfide, graphite, carbon, polytetrafluoroethylene, boron nitride, tungsten disulfide, and fluorine-based resin.

The coating layer 23 with this configuration has lipophilicity, whereby the quantity of the outflow oil can be reduced due to the lipophilicity of the coating layer 23. Thus, the total quantity of the outflow oil can be reduced.

INDUSTRIAL APPLICABILITY

The present invention can be applied to a technique of a manufacturing method for a sliding bearing, and can be applied to a manufacturing method for a sliding bearing including half members, obtained by splitting a cylinder in half in a direction parallel with an axial direction, arranged in an upper and lower direction, and to the sliding bearing.

REFERENCE SIGNS LIST

1 Sliding bearing
2 Half member
2a Circumference edge portion
3 Narrow groove
11 Crankshaft
21 Metal layer
22 Lining layer
23, 23a Coating layer

The invention claimed is:

1. A manufacturing method for a sliding bearing including half members, obtained by splitting a cylinder in half in a direction parallel with an axial direction, arranged in an upper and lower direction, the method comprising:
   a first step comprising forming a narrow groove extending in the circumference direction on an axial direction end of one of the half members on a lower side, on a downstream side in a rotation direction;
   a second step comprising performing shot blasting on a surface of the narrow groove; and
   a third step comprising forming coating layers on a surface of the half member,
   wherein in the third step, the coating layers are formed only on an upstream-side end and a downstream-side end as cans of the narrow groove.

2. The manufacturing method for a sliding bearing according to claim 1, wherein the coating layers formed in the third step each include at least one of molybdenum disulfide, graphite, carbon, polytetrafluoroethylene, boron nitride, tungsten disulfide, and fluorine-based resin.

3. The manufacturing method for a sliding bearing according to claim 2,
   wherein a circumference edge portion is formed on a surface on an outer side of the narrow groove in the axial direction, and
   wherein the circumference edge portion is formed to have a height from an outer circumference surface of the half member shorter than a height of a contact surface from the outer circumference surface of the half member.

4. The manufacturing method for a sliding bearing according to claim 1,
   wherein a circumference edge portion is formed on a surface on an outer side of the narrow groove in the axial direction, and
   wherein the circumference edge portion is formed to have a height from an outer circumference surface of the half member shorter than a height of a contact surface from the outer circumference surface of the half member.

* * * * *